(12) United States Patent
Sundararajan et al.

(10) Patent No.: US 7,278,024 B2
(45) Date of Patent: Oct. 2, 2007

(54) SESSION AUTHENTICATION USING TEMPORARY PASSWORDS

(75) Inventors: Muralidharan Sundararajan, Portland, OR (US); John J. Light, Beaverton, OR (US); Trevor A. Pering, Mountain View, CA (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 10/621,794

(22) Filed: Jul. 16, 2003

(65) Prior Publication Data

US 2005/0015604 A1   Jan. 20, 2005

(51) Int. Cl.
*H04K 1/00* (2006.01)
*G06F 7/04* (2006.01)

(52) U.S. Cl. ................ 713/183; 713/184; 713/185; 726/27

(58) Field of Classification Search ................ 713/183, 713/202
See application file for complete search history.

(56) References Cited

U.S. PATENT DOCUMENTS

| | | | | |
|---|---|---|---|---|
| 5,428,349 A * | 6/1995 | Baker | ........................ | 340/5.54 |
| 6,112,187 A * | 8/2000 | Fukawa | ........................ | 705/18 |
| 6,209,104 B1 * | 3/2001 | Jalili | ........................... | 726/18 |
| 6,332,161 B1 * | 12/2001 | Sasson | ........................ | 709/227 |
| 6,720,860 B1 * | 4/2004 | Narayanaswami | .......... | 340/5.54 |
| 6,950,949 B1 * | 9/2005 | Gilchrist | ....................... | 726/19 |
| 6,980,081 B2 * | 12/2005 | Anderson | ................... | 340/5.53 |
| 6,983,381 B2 * | 1/2006 | Jerdonek | ........................ | 726/5 |
| 2002/0040346 A1 * | 4/2002 | Kwan | ........................... | 705/51 |
| 2002/0112169 A1 * | 8/2002 | Hong | ........................... | 713/184 |
| 2003/0041251 A1 * | 2/2003 | Kumhyr | ...................... | 713/184 |
| 2003/0163738 A1 * | 8/2003 | Couillard | ..................... | 713/202 |
| 2003/0229791 A1 * | 12/2003 | De Jong | ...................... | 713/182 |

* cited by examiner

*Primary Examiner*—Emmanuel L. Moise
*Assistant Examiner*—Techane Gergiso
(74) *Attorney, Agent, or Firm*—Michael R. Barre

(57) ABSTRACT

Authenticating a user of an un-trusted computing system, the user having at least one portable computing device coupled to a peripheral device, may be accomplished by randomly generating a temporary password by the portable computing device, sending the temporary password to the peripheral device, rendering the temporary password by the peripheral device for perception by the user, inputting a password, by the user, into the un-trusted computing system, receiving, by the portable computing device, the password input by the user from the un-trusted computing system, and allowing access to the portable computing device using the un-trusted computing system when the temporary password matches the user-inputted password. In one embodiment, the peripheral device may be a small form factor device worn by the user. In one embodiment, the user may carry or have immediate access to multiple portable computing devices.

24 Claims, 2 Drawing Sheets

SESSION AUTHENTICATION USING TEMPORARY PASSWORDS

BACKGROUND

1. Field

The present invention relates generally to computer security and ubiquitous computing and, more specifically, to authentication of a user at an un-trusted public access computing system.

2. Description

User authentication is a central component of currently deployed computer security infrastructures. User authentication involves determining if the person attempting to gain access to a system is indeed a person authorized for such access. There are three main techniques for user authentication: 1) knowledge-based systems, which involve allowing access according to what a user knows; 2) token-based systems, which involve allowing access according to what a user possesses; and 3) biometrics-based systems, which involve allowing access according to what the user is. Although biometrics can be useful for user identification, one problem with these systems is the difficult tradeoff between imposter pass rate and false alarm rate. In addition, many biometric systems require specialized devices, which may be expensive. Token-based schemes are problematic if the token is misplaced or stolen. Most token-based authentication systems also use knowledge-based authentication to prevent impersonation through theft or loss of the token. An example is automated teller machine (ATM) authentication, which requires a combination of a token (e.g., a bank card) and secret knowledge (e.g., a personal identification number (PIN)). For these and other reasons, in today's computer systems knowledge-based techniques are predominantly used for user authentication.

Despite their wide usage, textual passwords and PINs have a number of shortcomings. Many users forget their passwords and PINs. Simple or meaningful passwords are easier to remember, but are vulnerable to attack. Passwords that are complex and arbitrary are more secure, but are difficult to remember. Since users can only remember a limited number of passwords, they tend to write them down or will use similar or even identical passwords for different purposes. This of course weakens the security of systems used with the passwords. As ubiquitous computing becomes more widely used, a single user may have many computing devices available, each with its own password for access to the device. In addition, some systems may be vulnerable to a keystroke-saving program or a device that supports a "replay attack." Such a technique may be used surreptitiously to capture the inputting of the password by the authorized user in order to facilitate subsequent unauthorized access by another.

This problem of replay attacks is exacerbated for the situation where a user desires to use an un-trusted public access computing system. For example, an un-trusted public access computing system may be sited in a café, an airport lounge, a public library, a hotel lobby, or other public place. An individual user makes only temporary use of the system, and has little control over its overall security. Unknown to the user, a malicious person may have instituted an input capturing device or program in the system to capture the user's password or other user data.

Hence, techniques to deter replay attacks by malicious persons in the situation of un-trusted public access computing systems are desirable.

BRIEF DESCRIPTION OF THE DRAWINGS

The features and advantages of the present invention will become apparent from the following detailed description of the present invention in which.

DETAILED DESCRIPTION

Public Internet access points, such as those found in airports, libraries, Internet cafés, hotels, and other public places, provide convenient, social, and economical access to the web, although at an increased security risk. Such public access points are becoming increasingly popular. However, while convenient, these access points represent a security risk because they are typically out of the control of the patron (e.g., Internet user), and sometimes even the proprietor (e.g., café owner). For example, it would be relatively easy for an individual to walk into most Internet cafés and insert a small device between the keyboard and main computer that captures all of the user's keystrokes. Furthermore, once this technique has been used to capture a text-based password, that same password can be used, unaltered, to re-login to the same website or system and possibly others, at any time.

To deter such replay attacks at public access points, embodiments of the present invention comprise a method and system for authenticating a user when the user desires to use an un-trusted public access computing system. In at least one embodiment, the user gains access to data stored on a portable computing device via the un-trusted public access computing system. The portable computing device randomly generates a password valid for a relatively short period of time. After the period of time expires, the password becomes invalid and unusable. The portable computing device sends the randomly generated, temporary password to a small peripheral device worn or carried by the user. The peripheral device displays or otherwise renders the temporary password to the user, and the user enters the password at the un-trusted public access computing system. The un-trusted system forwards the user-entered password, typically using a wireless communications link, to the portable computing device. The portable computing device then compares the randomly generated, temporary password with the user-entered password. If they match, then the user is authenticated for accessing data on the portable computing device or for other processing with the portable computing device. Since each randomly generated password is only valid for a relatively short amount of time, and the set of possible passwords may be large, a password may only be used once, thereby deterring a replay attack.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
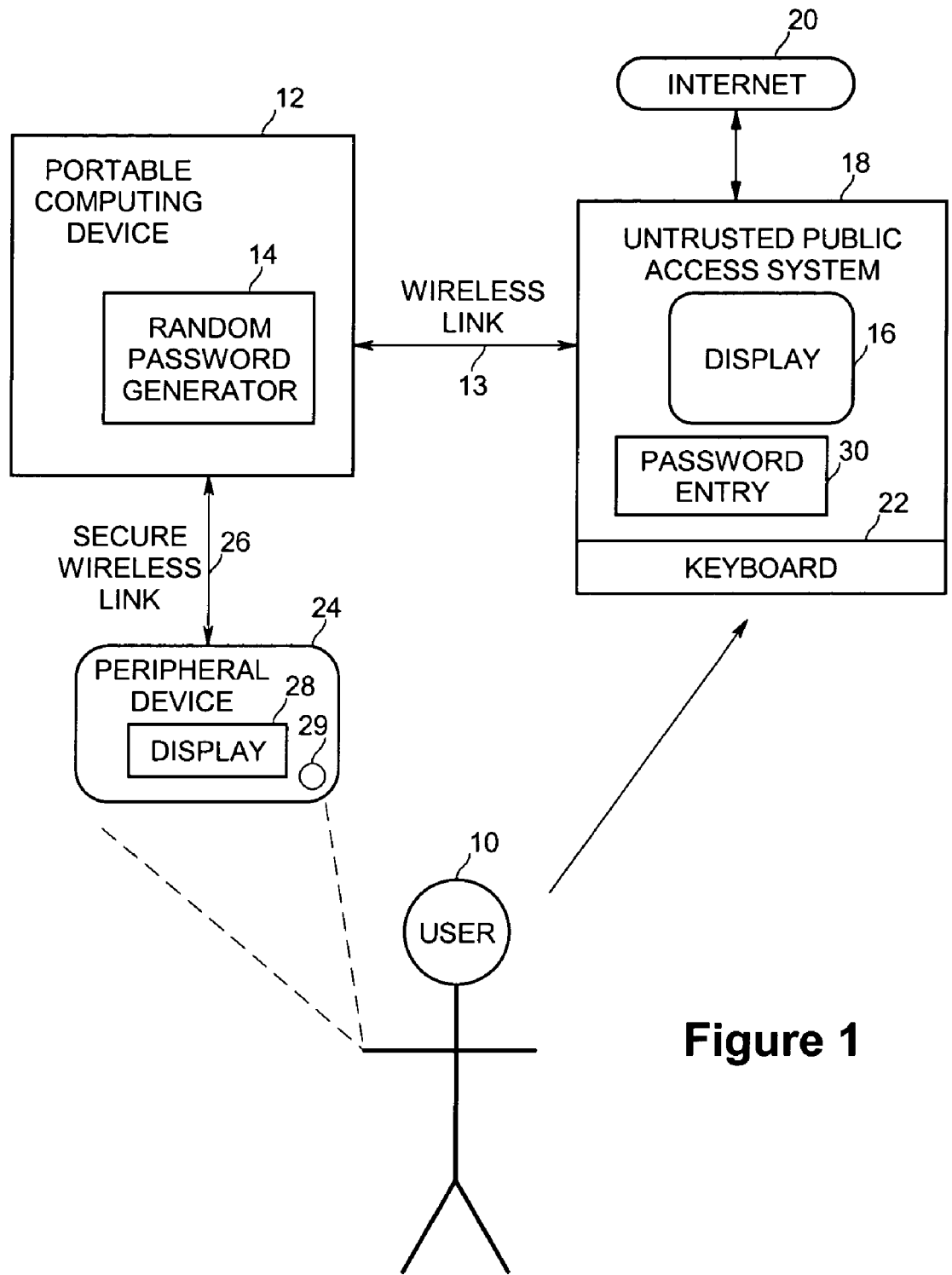
FIG. 1 is a diagram of a system supporting session authentication using temporary passwords according to an embodiment of the present invention.

FIG. 1 is a diagram of a system supporting session authentication using temporary passwords according to an embodiment of the present invention. A user 10 carries or wears a small portable computing device 12. For example, the portable computing device may be in the pocket of a user's shirt, coat, or pants, in a briefcase, backpack, or handbag, or perhaps worn as part of the user's clothing or jewelry. In some embodiments, the portable computing device may be about as large as a deck of playing cards or even smaller. It is contemplated that in the future, a user may wear and/or carry multiple portable computing devices at a time (e.g., five devices, 10 devices, etc.). In at least one embodiment, the user may be situated in a public place having an un-trusted public access computing system 18. The public place may be a coffee shop, a bookstore, an airport lounge, a hotel lobby, a library, a mall, or any other establishment where people may congregate. The portable computing device 12 may be a handheld or wearable computing device such as a personal server (PS), a personal digital assistant (PDA), a cellular phone, a tablet PC, a portable audio player, a portable video player, or other handheld device.

In at least one embodiment, the portable computing device comprises a mobile computing system designed to enable interaction with a user's personal data through the surrounding publicly available computing infrastructure. In one embodiment, the portable computing device includes no display or elaborate input mechanisms. Instead, the portable computing device temporarily co-opts the displays, keyboards, mice, and/or other input and output devices of nearby publicly available computing systems through a short-range wireless link 13.

This usage model addresses two major problems associated with mobile information access: the inherent difficulty of using small user interfaces on handheld devices, and the limited access to personal digital information afforded by public access points. The portable computing device includes a localized communication capability using well-known wireless techniques (e.g., Bluetooth, Wi-Fi, etc.), and enough high-density storage and low power, high performance processing to serve the user's mobile computing and storage needs. The result is that a mobile user can enjoy the benefits of a large display and a full sized keyboard without having to carry a bulky computing platform with him or her.

The portable computing device may include memory to store the user's data, such as text files, audio files, image files, video files, data files, etc. In one embodiment, the portable computing device comprises at least a microprocessor, dynamic random access memory, flash memory, an input/output (I/O) interface, a compact flash (CF) slot, a wireless communications module (e.g., a Bluetooth module), and a battery. The microprocessor executes instructions stored in at least one of the memory devices to provide the functionality described herein. The wireless communications module operates to allow wireless communication between the device and other systems. The memory devices also store the user's data, as well as one or more randomly generated temporary passwords.

In one embodiment, the portable computing device stores the user's data and, through an interactive session, may control the display of the user's data on a display 16 of (or other rendering by) an un-trusted public access computing system 18. The public access computing system may comprise a personal computer (PC), a computer terminal coupled to a computer system, a computer-based kiosk, a stand-alone display, or any other device capable of communicating with one or more portable computing devices and/or a network, such as the Internet 20. The public access computing system may comprise one or more conventional input devices, such as keyboard 22. The public access computing system may also comprise well-known components for wirelessly communicating with other devices.

In at least one embodiment, communications between the portable computing device and the un-trusted public access computing system may be based on web protocols such as universal plug and play (UPnP), Simple Object Access Protocol (SOAP), and Hyper Text Transport Protocol (HTTP), which may be layered on top of an Internet Protocol (IP) networking stack enabled by a Bluetooth personal area network (PAN) profile. Basic UPnP setup may be accomplished by a UPnP "device" broadcasting a service description which is picked up by the respective UPnP "control point." SOAP may be used to directly communicate between the two devices.

Prior to communicating any user data from the portable computing device to the display 16 of the un-trusted public access computing system 18, the user should be authenticated. That is, it is desirable to verify that the person operating the portable computing device is actually the device's owner, and not someone who has stolen the device, someone who wants to examine the contents of the device while the device is temporarily outside of the immediate control of the owner, or someone who is covertly accessing the portable computing device using another computing device and an accessible wireless link. Furthermore, since the public access computing system is un-trusted by the user, the user may be apprehensive about typing in the user's password on a keyboard of the public access computing system prior to wireless communications between the public access computing system and the portable computing device. In some cases, the keystrokes input by the user could be captured by a device placed in the public access computing system by an attacker. If the keystrokes contain the user's log-in and password information for accessing the user's personal information (e.g., a bank account number, a personal web page, and so on) or for use of the portable computing device, the attacker may gain unauthorized access to the information and/or the portable computing device.

To deter this from occurring, embodiments of the present invention provide techniques for authenticating the user of the portable computing device in such a way that the un-trusted public access computing system deters future unauthorized access to the user's data on the portable computing device or other use of the portable computing device. Furthermore, observation of displays of the un-trusted public access computing system or capturing the temporary password used will not provide an attacker with sufficient information to stage a replay attack.

In at least one embodiment, portable computing device 12 comprises a random password generator 14. In one embodiment, the password may be a number having a plurality of digits and the random password generator comprises a random number generator. In one embodiment, true random numbers may be generated by converting the electrical noise generated by a Zener diode included in the portable computing device into a random integer according to known methods. In one embodiment, the number of digits of the randomly generated password may be small (e.g., less than five). In another embodiment, other tokens may be used for the password components such as letters, symbols, images, icons, shapes, or any other images recognizable by the user. In such an embodiment, each password component may be associated with a randomly generated number. The portable computing device stores the randomly generated password and sets a timer (implemented in either hardware or software) to monitor how long the password is valid. The validity time may be set by the portable computing device to any appropriate length of time, depending on the security requirements and usability of a particular implementation. For example, in one embodiment, the password may be valid for a period of time only sufficient for the user to obtain the temporary password and enter the password into the un-trusted public access computing system (e.g., less than one minute, 30 seconds, 45 seconds, etc.). When the timer expires, the current randomly generated temporary password is no longer valid, and a new temporary password may be randomly generated. In this way, passwords may be continually generated serially by the portable computing device (i.e., in a non-overlapping manner). In one embodiment, the generation of passwords may be periodic and the validity time periods may be the same. In another embodiment, the frequency of generating the passwords may be varied or random, and the validity times may also be varied.

When a new password is randomly generated by random password generator 14, the portable computing device sends the password to a peripheral device 24 over a secure wireless link 26. In another embodiment, the secure link between the portable computing device and the peripheral device may comprise a wired link. In yet another embodiment, the peripheral device may be physically part of the portable computing device with a direct connection between the two components. In one embodiment, the peripheral device 24 comprises a display 28 for displaying the randomly generated password to the user. In one embodiment, the peripheral device comprises at least one input mechanism such as button 29. In one embodiment, the peripheral device may be a small form factor device worn or carried by the user. For example, the peripheral device may be in the form of a wristwatch-like device worn on a strap around the user's wrist, a piece of jewelry worn on the user's body, or a device attached to or integral with a piece of clothing worn by the user. Generally, the peripheral device may comprise any circuitry and components to render the password for perception by the user. For example, the password may be displayed on a display so the user can perceive it visually or the password may be audibly rendered by a loudspeaker, headphone, or other ear-mounted speaker for hearing by the user. In one embodiment, the display 28 may be a head-mounted display. In another embodiment, the peripheral device comprises a device worn in, on, or near the user's ear. In another embodiment, the peripheral device comprises a cell phone, PDA, or other portable device carried by the user.

When the user desires to access data on the portable computing device via the un-trusted public access computing system, the user needs to get the current temporary password. The user must be in control of or sufficiently close to the portable computing device so that the device can communicate with the peripheral device. In one embodiment, the randomly generated, temporary password may be rendered for the user in response to the user performing some action with the peripheral device, for example, by pushing a button 29 on the peripheral device. When the user perceives the randomly generated, temporary password, the user may then enter the password into the un-trusted public access computing system using any input method. For example, when the password is a number or a sequence of letters or special characters, the user simply types in the number, letters, or special characters when prompted by the un-trusted public access computing system. When the password comprises other tokens such as symbols, images, or colored shapes, the portable computing device wirelessly sends display information (e.g., web pages) to the un-trusted public access system to be shown to the user to facilitate the user selecting the password from among images shown on the display 16. The un-trusted public access computing system comprises a password entry component 30 to receive the password inputted by the user.

In one embodiment, when the user wants to get a temporary password, the user initiates an input action on the peripheral device (such as pushing a button, for example). In response, the peripheral device communicates a request to the portable computing device to randomly generate a new temporary password. When this communication is received by the portable computing device, the device randomly generates a new temporary password to replace a currently existing password, and sends the new temporary password to the peripheral device for rendering to the user.

The un-trusted public access computing system sends the user-inputted password to the portable computing device. The portable computing compares the user-inputted password to the randomly generated temporary password that is currently valid. If the passwords match, access to data stored by the portable computing device and/or other use of the portable computing device may be allowed. If the passwords do not match, access to the data and/or use of the device may be denied. Since the password is temporary, recording this password and retyping it at the public access computing system by an attacker at a later time will not provide access to the portable computing device. In essence, access to the portable computing device is only through the temporary password valid for only a short period of time. Thus, the present invention is immune from a replay attack because the temporary password is not valid after it expires and recording a set of used passwords yields no insight into what the next password will be, because the passwords are truly randomly generated.

One advantage of the present invention is the protection against an attacker wirelessly connecting to the portable computing device through an unseen access point and then trying to access the user's data. In this case, the attacker will not be able to learn any valid passwords because the communications link between the portable computing device and the peripheral device is secure. In one embodiment, the communications link may be made secure using known cryptographic methods (e.g., triple data encryption standard (DES) encryption using a shared secret key between the portable computing device and the peripheral device).

Figure 2:
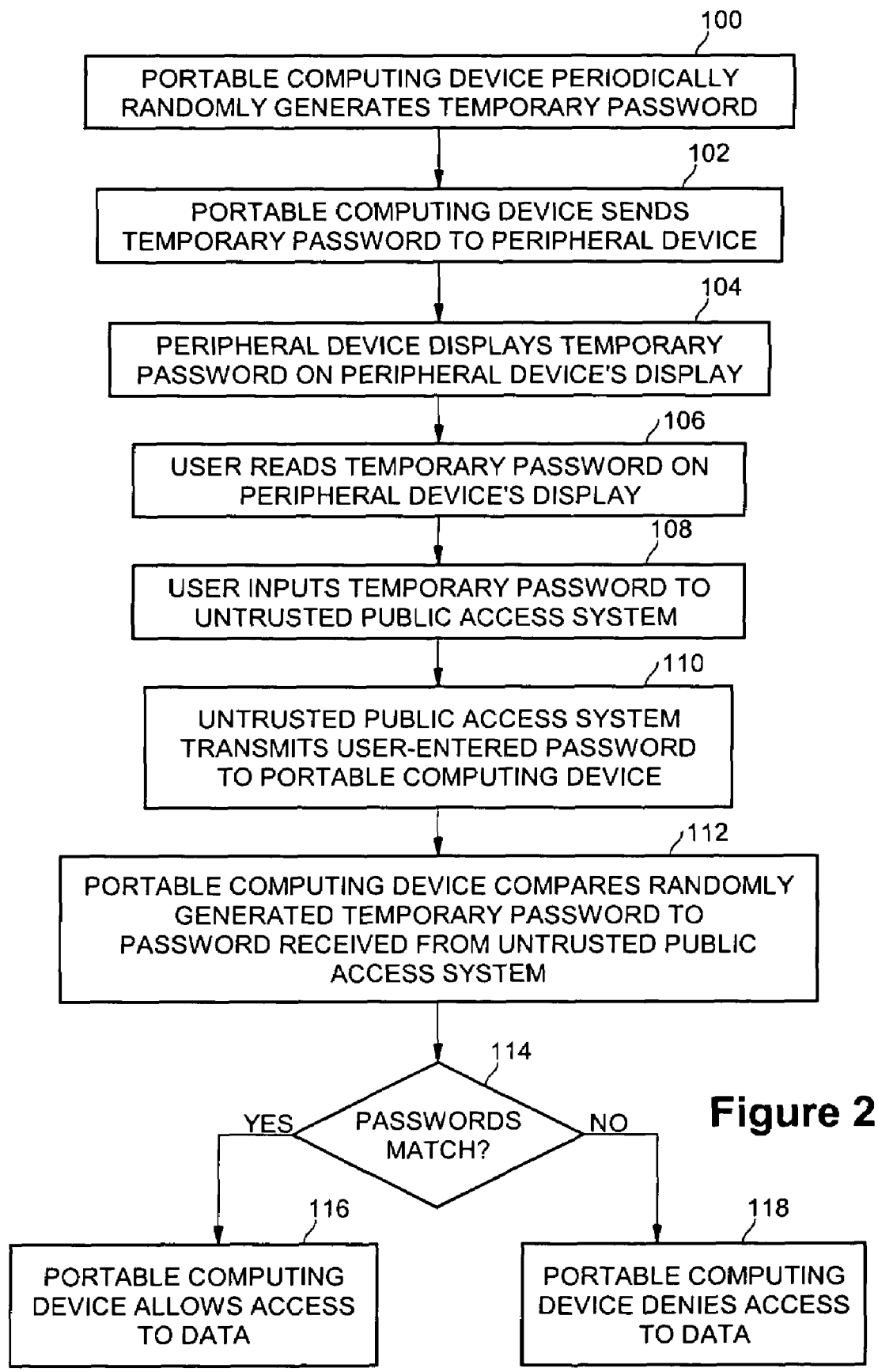
FIG. 2 is a flow diagram illustrating session authentication processing according to an embodiment of the present invention.

FIG. 2 is a flow diagram illustrating session authentication processing using a temporary password according to an embodiment of the present invention. At block 100, the portable computing device generates a random password. The password is valid for a predetermined period of time (i.e., it is temporary). In one embodiment, the temporary password may be generated periodically. At block 102, the portable computing device sends the randomly generated temporary password to the peripheral device. In one embodiment, this may be accomplished used a secure wireless or wired communications link. When the user desires to access data stored on the portable computing device, the user must obtain the temporary password. In one embodiment, the user may initiate an action on the peripheral device using an input mechanism (such as pushing a button, for example), causing the peripheral device to "wake up" and communicate the password to the user. In this embodiment, initiating the action may cause the peripheral device to obtain a new temporary password that will be valid for a predetermined time period sufficient for the user to enter it to become authorized to access the portable computing device. In another embodiment, the portable computing device may also communicate a counter to the peripheral device that informs the user how much time is left to enter the password. In one embodiment, the counter may count down to zero, at which time the temporary password is no longer valid. In one embodiment, the counter may count the number of seconds left until expiry of the password. The peripheral device may display the counter to the user along with the temporary password.

At block 104, the peripheral device renders the temporary password for perception by the user. In one embodiment, this may involve displaying the temporary password on a display of the peripheral device. In another embodiment, a counter showing the time until the temporary password expires may also be displayed.

Next, at block 106, the user obtains the temporary password from the peripheral device. In one embodiment, the user reads the peripheral device's display to get the password.

It may be assumed that one of the reasons the user desires to access the portable computing device is to take advantage of resources available via the un-trusted public access computing system (e.g., a display, an Internet connection, and so on). Once the user knows the temporary password, the user may enter the temporary password into the un-trusted public access computing system. However, prior to entering the temporary password, the un-trusted public access computing system may be made aware of the presence of the portable computing device and the need for user authentication via a login mechanism. In one embodiment, the portable computing device may discover the un-trusted public access computing system through a well-known wireless discovery protocol such as Bluetooth, and based on an internal profile of devices set up by the user, the portable computing device may automatically initiate a connection to the un-trusted system providing, for example, a TCP/IP connection over a personal area network (PAN) link.

In another embodiment, the reverse process may be used, where the un-trusted system discovers the portable computing device and offers the option of connecting to the near-by portable computing device. At this point, the un-trusted system may use a well-known program such as an Internet browser (e.g., Internet Explorer from Microsoft Corporation) to establish an HTTP connection over the TCP/IP link to the portable computing device. The portable computing device may then prompt the user for entry of the temporary password by sending appropriate Hyper Text Markup Language (HTML) web pages to the un-trusted system to be displayed in a browser window to the user. In this embodiment, the portable computing device may define how the password prompt is presented to the user by the un-trusted system.

In response to a prompt displayed by the un-trusted system, the user inputs the temporary password into the un-trusted public access computing system using conventional methods at block 108. Inputting of the password may be accomplished using one or more known techniques, such as typing on a keyboard or selecting with a mouse. At block 110, the un-trusted public access computing system transmits the user-entered password to the portable computing device. In at least one embodiment, this transmission is made over a wireless link previously made as a result of performing a discovery protocol. At block 112, the portable computing device compares the randomly generated temporary password that is currently valid to the user-entered password received from the un-trusted public access computing system. If the passwords match at block 114, then the portable computing device allows access to data stored in the portable computing device or other use of the portable computing device at block 116. Otherwise, access and/or use may be denied at block 118.

With embodiments of the present invention, since the temporary password changes frequently, the user does not have to remember them. Instead, the user obtains the current temporary password only when access is desired. Embodiments of the present invention fit well with emerging technologies such as body area networks (BANs) and personal area networks (PANs). If future clothing performs the function of a BAN, it is possible that a person may carry many computing devices connected together through the BAN. The need for secure access to these devices through un-trusted public access points is likely to be more common. In such cases, it is impractical for the user to remember many passwords, whereas in the present invention, all devices on a BAN may send their passwords to the peripheral device. In such an embodiment, the communication to the peripheral device may be protected by encryption to increase security. Thus, in some embodiments, the peripheral device may be used to obtain temporary passwords for multiple portable computing devices. In some embodiments, the peripheral device may link to multiple portable computing devices using a secure wireless link based on an encrypted channel with a common encryption key shared between them. Since an individual owns the portable computing devices and the peripheral device, a shared key common to each device may be feasible and secure.

In one embodiment, the peripheral device and portable computing device may be integral. In this case, transmission of the password from the portable computing device to the peripheral device is unnecessary. However, this embodiment has a disadvantage in that if the user loses the portable computing device, anyone may gain access to the data since the temporary password would be displayed on the portable computing device rather than the peripheral device. When the peripheral device is separate from the portable computing device, the user may not have to physically take the device out of a pocket or briefcase or physically handle the portable computing device in order to gain access to the data stored therein.

In one scenario, the portable computing device may be sewn into clothing. In such a scenario, physically handling the device in order to look at the password whenever secure access is desired may be impractical. Having the display on the peripheral device separate from the portable computing device offers the advantage in that unless a person has both the peripheral device and the portable computing device, access is deterred. This becomes useful as the number of portable computing devices worn or carried by a user increases and the chance of losing one or more of them becomes higher. Having separate devices may also allow the peripheral device to be a smaller device.

In another embodiment, additional processing may take place to increase security by ensuring that the un-trusted public access computing system 18 the user is interacting with is the same system that the portable computing device 12 is communicating with. In this embodiment, the portable computing device may instruct the un-trusted public access computing system to display an indicator on the display 16. The portable computing device may also instruct the peripheral device 24 to display the same indicator on the peripheral device's display 28. When the user sees that the indicator shown on the display of the peripheral device matches the displayed indicator shown on the un-trusted public access computing system, the user may be assured that the portable computing device and that particular un-trusted public access computing system are in communication for purposes of user authentication. In one embodiment, the indicator may be displayed prior to the peripheral device rendering the temporary password to the user. The indicator may be any image recognizable by the user (e.g., a number, a letter, a symbol, a logo, etc.). The indicator may be randomly generated and changed by the portable computing device either periodically or at random times. If the un-trusted public access system does not display the same indicator rendered for the user by the peripheral device (or displays no indicator), the user may assume that the un-trusted public access computing system is not communicating with the user's portable computing device and authentication efforts should be stopped.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-processor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action or produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of using a portable computing device to authenticate a user to use an un-trusted computing system to access user data on the portable computing device, the method comprising:

randomly generating, on the portable computing device, a temporary password for controlling access to the user data on the portable computing device;

setting a time limit of less than one minute for the temporary password to remain valid;

sending the temporary password from the portable computing device to a peripheral device coupled to the portable computing device;

rendering the temporary password by the peripheral device for perception by the user;

receiving a user-inputted password at the un-trusted computing system;

after receiving the user-inputted password at the un-trusted computing system, sending the user-inputted password from the un-trusted computing system to the portable computing device;

determining, at the portable computing device, whether the user-inputted password matches the temporary password;

determining, at the portable computing device, whether the time limit has been exceeded; and allowing the user to access the user data on the portable computing device via the un-trusted computing system in response to determinations that the temporary password matches the user-inputted password and the time limit has not been exceeded.

2. The method of claim 1, wherein randomly generating the temporary password comprises randomly generating the temporary password periodically.

3. The method of claim 1, wherein randomly generating the temporary password comprises randomly generating the temporary password in response to a user-initiated action to the peripheral device.

4. The method of claim 1, wherein sending the temporary password to the peripheral device comprises sending the temporary password from the portable computing device to the peripheral device over a secure wireless link.

5. The method of claim 1, wherein rendering the temporary password comprises displaying the temporary password on a display of the peripheral device.

6. The method of claim 5, further comprising displaying a number of seconds until the temporary password expires on a display of the peripheral device.

7. The method of claim 1, wherein rendering the temporary password comprises rendering the temporary password audibly for hearing by the user.

8. The method of claim 1, wherein the password comprises at least one of numbers, letters, symbols, images, and shapes.

9. The method of claim 1, further comprising detecting initiation of an action by the user to the peripheral device to cause the rendering of the temporary password.

10. The method of claim 1, further comprising:
generating an indicator by the portable computing device;
sending the indicator to the peripheral device and to the un-trusted computing system;
rendering the indicator by the peripheral device for perception by the user;
rendering the indicator by the un-trusted computing system for perception by the user;
determining, by the user, whether the indicator rendered by the peripheral device matches the indicator rendered by the un-trusted computing system;
wherein the user inputs a password only when the indicator rendered by the peripheral device matches the indicator rendered by the un-trusted computing system the user desires to use.

11. The method of claim 1, wherein the peripheral device is at least one of worn by the user and carried by the user.

12. The method of claim 1, wherein the portable computing device and the un-trusted computing system communicate over a wireless link.

13. An article comprising:
a computer readable storage medium having a plurality of machine readable instructions, wherein when the instructions are executed by a processor, the instructions cause execution of operations comprising:
randomly generating on a portable computing device, a temporary password for controlling access to user data on the portable computing device;
setting a time limit of less than one minute for the temporary password to remain valid;
sending the temporary password from the portable computing device to a peripheral device coupled to the portable computing device;
rendering the temporary password by the peripheral device for perception by a user;
receiving a user-inputted password at the un-trusted computing system;
after receiving the user-inputted password at the un-trusted computing system, sending the user-inputted password from the un-trusted computing system to the portable computing device;
determining, at the portable computing device, whether the user-inputted password matches the temporary password;
determining, at the portable computing device, whether the time limit has been exceeded; and
allowing the user to access the user data on the portable computing device via the un-trusted computing system in response to determinations that the temporary password matches the user-inputted password and the time limit has not been exceeded.

14. The article of claim 13, wherein instructions for randomly generating the temporary password comprise instructions for randomly generating the temporary password periodically.

15. The article of claim 13, wherein instructions for sending the temporary password to the peripheral device comprise instructions for sending the temporary password from the portable computing device to the peripheral device over a secure wireless link.

16. The article of claim 13, wherein the password comprises at least one of numbers, letters, symbols, images, and shapes.

17. A system for authenticating a user desiring to use an un-trusted computing system comprising:
an un-trusted computing system;
a portable computing device operable to communicate with the un-trusted computing system; and
a peripheral device, coupled to the portable computing device, capable of rendering a password for perception by the user;
the portable computing device comprising:
a random password generator to randomly generate a temporary password for controlling access to user data on the portable computing device;
a memory to store instructions and the user data; and
a processor to execute the instructions obtained from the memory to set a time limit of less than one minute for the temporary password to remain valid, to send the temporary password to the peripheral device for rendering to the user, to receive from the un-trusted computing system a user-inputted password, to determine whether the user-inputted password matches the temporary password, to determine whether the time limit has been exceeded, and to allow the user to access the user data on the portable computing device via the un-trusted computing system in response to determinations that the temporary password matches the user-inputted password and the time limit has not been exceeded.

18. The system of claim 17, wherein the peripheral device comprises a display and renders the password by displaying the password on the display.

19. The system of claim 17, wherein the portable computing device communicates with the peripheral device over a secure wireless link.

20. The system of claim 17, wherein the portable computing device communicates with the un-trusted computing system over a wireless link.

21. The system of claim 17, wherein the random password generator randomly generates the temporary password periodically, the temporary password valid for only a predetermined period of time.

22. The system of claim 17, wherein the peripheral device is capable of being at least one of worn and carried by the user.

23. The system of claim 17, wherein the peripheral device comprises an input mechanism activation of which initiates rendering of the password by the peripheral device.

24. The system of claim 17, wherein the peripheral device comprises an input mechanism activation of which causes the portable computing device to randomly generate a new temporary password.

* * * * *